(12) United States Patent
Rajic et al.

(10) Patent No.: US 7,096,249 B2
(45) Date of Patent: Aug. 22, 2006

(54) METHOD AND SYSTEM FOR DISTRIBUTING APPLICATIONS

(75) Inventors: Hrabri L. Rajic, Urbana, IL (US); Robert H. Kuhn, White Heath, IL (US)

(73) Assignee: Intel Corporation, Santa Clara, CA (US)

( * ) Notice: Subject to any disclaimer, the term of this patent is extended or adjusted under 35 U.S.C. 154(b) by 700 days.

(21) Appl. No.: 10/109,938

(22) Filed: Mar. 29, 2002

(65) Prior Publication Data

US 2003/0187983 A1   Oct. 2, 2003

(51) Int. Cl.
G06F 15/16 (2006.01)

(52) U.S. Cl. .................................. 709/201; 709/203

(58) Field of Classification Search ........ 709/201–203, 709/217–219, 223, 225, 229, 245; 719/315, 719/316, 313, 328; 707/200, 10
See application file for complete search history.

(56) References Cited

U.S. PATENT DOCUMENTS

| | | | | |
|---|---|---|---|---|
| 5,222,193 A * | 6/1993 | Brooks et al. | ................ | 706/25 |
| 5,727,159 A | 3/1998 | Kikinis | | |
| 5,862,328 A * | 1/1999 | Colyer | ....................... | 709/203 |
| 5,881,230 A * | 3/1999 | Christensen et al. | ........ | 709/203 |
| 5,905,872 A * | 5/1999 | DeSimone et al. | ......... | 709/245 |
| 5,987,506 A * | 11/1999 | Carter et al. | ................. | 709/213 |
| 6,006,266 A * | 12/1999 | Murphy et al. | ............. | 709/227 |
| 6,029,175 A * | 2/2000 | Chow et al. | ............. | 707/104.1 |
| 6,085,193 A * | 7/2000 | Malkin et al. | ................ | 707/10 |
| 6,125,388 A * | 9/2000 | Reisman | ..................... | 709/218 |
| 6,157,960 A * | 12/2000 | Kaminsky et al. | .......... | 719/315 |
| 6,182,111 B1 * | 1/2001 | Inohara et al. | ............. | 709/201 |
| 6,182,154 B1 * | 1/2001 | Campagnoni et al. | ...... | 719/315 |
| 6,182,155 B1 * | 1/2001 | Cheng et al. | ............... | 719/315 |
| 6,199,068 B1 * | 3/2001 | Carpenter | .................. | 707/100 |
| 6,223,217 B1 * | 4/2001 | Pettus | ........................ | 709/219 |
| 6,324,543 B1 * | 11/2001 | Cohen et al. | ............... | 707/200 |
| 6,425,017 B1 * | 7/2002 | Dievendorff et al. | ....... | 719/315 |
| 6,584,508 B1 * | 6/2003 | Epstein et al. | ............. | 709/229 |
| 6,615,258 B1 * | 9/2003 | Barry et al. | ................ | 709/223 |
| 6,704,768 B1 * | 3/2004 | Zombek et al. | ............. | 709/201 |
| 6,714,979 B1 * | 3/2004 | Brandt et al. | ............... | 709/225 |
| 6,754,709 B1 * | 6/2004 | Gbadegesin | ................ | 709/227 |
| 6,757,733 B1 * | 6/2004 | Gupta | ........................ | 709/229 |
| 6,775,671 B1 * | 8/2004 | de Lara et al. | ............... | 707/10 |
| 6,779,025 B1 * | 8/2004 | Wolfe et al. | ................ | 709/219 |
| 6,854,123 B1 * | 2/2005 | Lewallen | .................... | 719/328 |
| 6,868,448 B1 * | 3/2005 | Gupta et al. | ................ | 709/226 |
| 6,874,020 B1 * | 3/2005 | Da Palma et al. | .......... | 709/223 |
| 6,895,586 B1 * | 5/2005 | Brasher et al. | ............. | 719/313 |

(Continued)

OTHER PUBLICATIONS

Proxy Handlers archive.ncsa.uiuc.edu/SDG/Software/MacMosaic/Release-info/features.dir/Proxy.html.*

(Continued)

*Primary Examiner*—Thong Vu
(74) *Attorney, Agent, or Firm*—Blakely, Sokoloff, Taylor & Zafman LLP

(57) ABSTRACT

Methods and systems for distributing applications are described herein. In one aspect of the invention, an exemplary method includes receiving an original request for accessing a distributed resource management system (DRMS) through an application distributor application programming interface (API), the application distributor API being independent of the DRMS, selecting the DRMS as requested, translating the original request to be compatible with the selected DRMS, and transmitting translated request to the selected DRMS. Other methods and systems are also described.

17 Claims, 9 Drawing Sheets

U.S. PATENT DOCUMENTS

| | | | |
|---|---|---|---|
| 6,901,595 B1* | 5/2005 | Mukundan et al. | 719/316 |
| 6,931,434 B1* | 8/2005 | Donoho et al. | 709/207 |
| 6,934,756 B1* | 8/2005 | Maes | 709/227 |
| 6,959,320 B1* | 10/2005 | Shah et al. | 709/203 |
| 6,981,265 B1* | 12/2005 | Rees et al. | 719/313 |
| 2002/0055995 A1* | 5/2002 | Beckwith et al. | 709/223 |
| 2002/0103811 A1* | 8/2002 | Fankhauser et al. | 707/104.1 |
| 2003/0074418 A1* | 4/2003 | Coker | 709/217 |
| 2003/0105833 A1* | 6/2003 | Daniels et al. | 709/219 |
| 2004/0255048 A1* | 12/2004 | Lev Ran et al. | 709/249 |

OTHER PUBLICATIONS

A Viability Analysis of Cooperative Proxy Caching www.cs.utsa.edu/~sdykes/papers/ic01-viable.pdf.*

Aglet Context www.cis.upenn.edu/~bcpierce/courses/629/papers/AgletsBook-context.html.*

Simultaneous Proxy Evaluation—Dasison (1999) (Correct) (2 citations) ; www.ircache.net/Cache/Workshop99/Papers/davison1-final.ps.gz.*

The Agent Pattern: A Design Pattern for Dynamic and..—Silva, Delgado (1998) www.coldewey.com/europlop98/Program/Papers/Silva.ps.*

Interoperability of Event Channels of the Event Service of CORBA—In Java Orb dblab.ssu.ac.kr/Publication/99-Web-Eng.pdf.*

Reducing the Energy Usage of Oce Applications—Flinn, de Lara.. (2001) www.cs.rice.edu/~willy/papers/middleware01.ps.gz.*

Forwarding Requests among Reverse Proxies—Limin Wang Fred www.cs.princeton.edu/~lmwang/pubps/wcw/wcw.ps.*

A Web-Based Distributed Programming Environment—Aoki, Lee www.iis.sinica.edu.tw/~dtlee/dtlee/HPCN_comput.ps.*

HATS: Hierarchical Adaptive Transmission Scheduling..—de Lara, Wallach.. (2001) ; www.cs.toronto.edu/~delara/papers/mmcn2002/mmcn2001.ps.*

* cited by examiner

METHOD AND SYSTEM FOR DISTRIBUTING APPLICATIONS

FIELD

Embodiments of the invention relate to the field of distributed application; and more specifically, to distributed resource management system environments.

BACKGROUND

As the computer networks are getting more popular and the development of software applications getting more complex, the software applications are more often executed in parallel in a distributed environment. These applications that run on a master host could use distributed resource manager system (DRMS) to have the jobs executed on available compute servers.

However, in order to use a DRMS, the application developers have to redesign their applications for distributed execution. Normally, the redesigned distributed application submits jobs for execution, stages input and output files for the jobs, monitors and controls the remote jobs by making calls to an application programming interface (API) provided by a DRMS vendor. Typically, commercially available DRMSs have very different APIs that support different remote execution paradigms. As a result, this situation effectively precludes development of distributed applications by independent application vendors who cannot afford to support multiple DRMSs that might be installed on their end user sites.

In addition, one of the obstacles that the distributed application developers are facing is that the DRMS interfaces are designed on how to interact with the DRMS, rather than on how to accomplish common tasks that come up during developing distributed applications. Each DRMS API is distinctly different from each vendor. A developer is not only facing with the task of handling the program logic and mapping it to a variety of DRMS APIs, but also providing ways for an end user of the application to interact with the computing environment.

When a distributed application is an application that spawns child processes, there are situations where the application interchanges data with its child processes via a communication channel. When the child application is sent to a remote site for execution, the communication channel is broken. Therefore, a workable solution is needed.

BRIEF DESCRIPTION OF THE DRAWINGS

The invention may best be understood by referring to the following description and accompanying drawings that are used to illustrate embodiments of the invention. In the drawings.

DETAILED DESCRIPTION

A single portable application programming interface (API) is provided to support varieties of distributed resource management system (DRMS). The API provides single point of access for developers of distributed applications to interact with a DRMS without specific knowledge of the targeted DRMS. A mechanism is provided to further simplify and automate distributed application execution for the end users. In addition, a set of proxies for inter-machine communication is described that supports a communication between the parent application and its spawned child or helper applications when the parent application spawned helper applications are submitted for execution in a distributed environment. In the following description, numerous specific details are set forth. However, it is understood that embodiments of the invention may be practiced without these specific details. In other instances, well-known circuits, structures and techniques have not been shown in detail in order not to obscure the understanding of this description.

Figure 1:
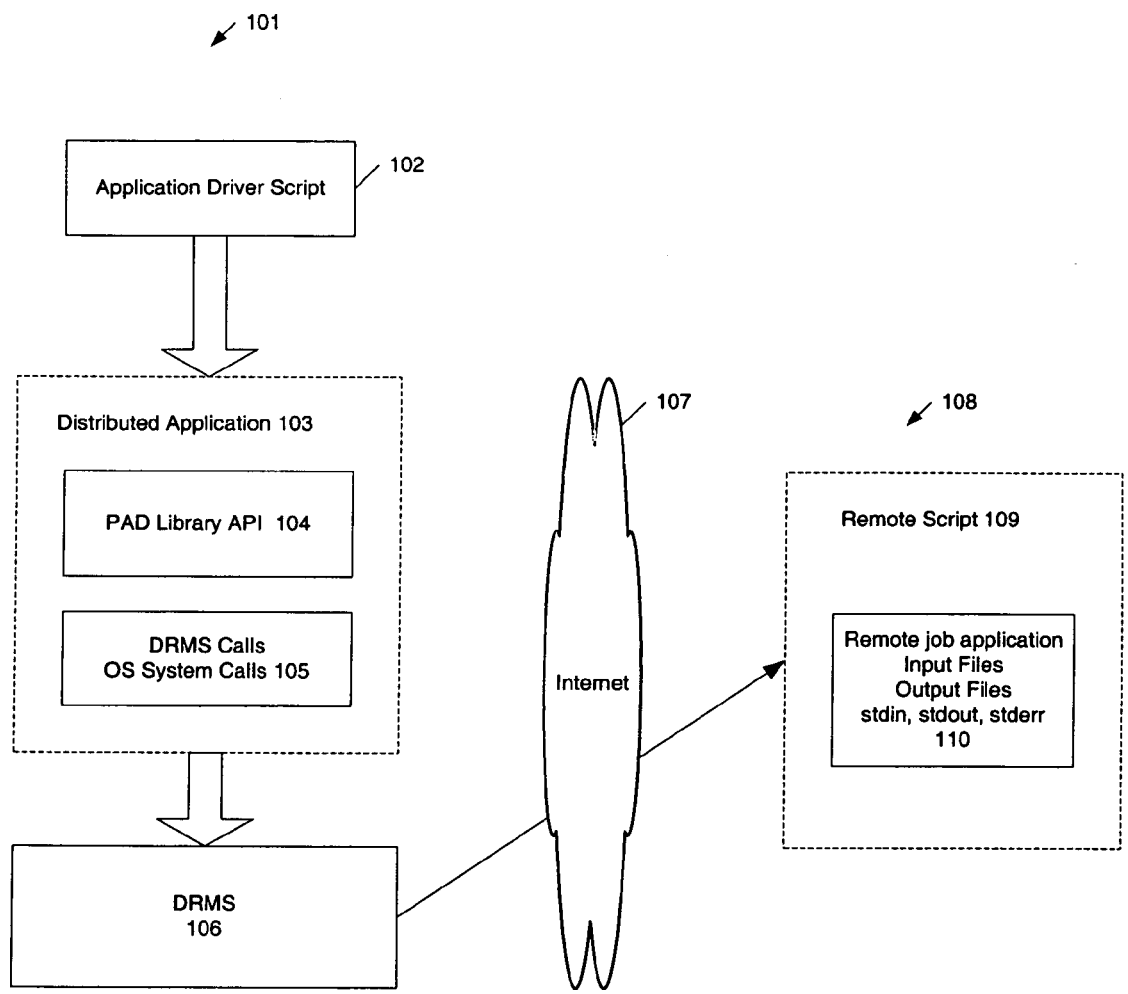
FIG. 1 illustrates an embodiment of an exemplary portable application distributor (PAD).

FIG. 1 illustrates an embodiment of a portable distributed application in a distributed machine system. Referring to FIG. 1, the distributed system includes a master host 101 and a remote compute server 108. The master host is also called local node and the remote compute server is also called remote node. The remote compute server 108 is connected to the master host 101 over a network 107. In one embodiment, the network 107 may be an Internet. Alternatively, the network 107 may be a local area network. When a distributed application is executed at a local node, a DRMS is used to schedule remote jobs on its behalf. A distributed application developer may use a library that implements portable application distributor (PAD) application programming interface (API) 104 to access a DRMS such as DRMS 106.

The DRMS 106 could be one of the varieties of the DRMS commercially available in the market. In one embodiment, the DRMS 106 may be LSF from Platform Computing. Alternatively, the DRMS 106 may be PBS or PBS Pro from Veridian, LoadLeveler from IBM, or enFuzion from TurboLinux. Other DRMS may be utilized. As discussed above, each DRMS has different architecture and different interface. Conventionally, a distributed application developer has to redesign or customize its application to be compatible with the targeted DRMS, in order to communicate with the targeted DRMS. Since there are varieties of DRMS out in the market, it would be a burden for the developer to develop different application for different DRMS vendors.

PAD API library encapsulates all of the specific information of most DRMS on the market. The API also provides a higher level abstraction than those provided by the DRMS vendors. The higher level abstraction makes the API much easier to use. For example, using an embodiment of the API, controlling or waiting for completion of all remote tasks could be accomplished with just a one call, without having full knowledge of the targeted DRMS. The specific DRMS internals are hidden from the developers such that they can spend more time on developing new functionality.

Referring to FIG. 1, a distributed application uses PAD API to place requests to the selected DRMS. The request may further include parameters passed to the DRMS by a person who is running the distributed application. A PAD library that implements the PAD API is initialized before being used by providing all the information that a DRMS might need. For example, a DRMS may be selected via an environmental variable that is either set directly via an environmental variable or within a script that is used to run the distributed application Other methods may be utilized. The rest of the DRMS specific variables needed for initialization are specified similarly. After the PAD library API use or at the end of the distributed application execution, the PAD library is disengaged.

Once the PAD library 104 receives a request for DRMS it selects a proper specific code based on the DRMS with which was initialized. The PAD library specific code 104 then translates the request to specific DRMS calls 105 compatible with the specific DRMS requested. The DRMS 106 then schedules the distributed application jobs to a proper compute server, such as compute server 108 over a network 107. Thereafter, the remote application is launched on the compute server.

As a result, a distributed application developer does not need to know specific API of each DRMS being accessed. Instead, the developer calls the PAD API 104 specifying a DRMS. The PAD library 104 properly translates the request to appropriate DRMS API and requests the execution of the job in a proper DRMS. The end user can specify different DRMS, only one per application, without actual knowledge of the specific DRMS being accessed.

As the distributed application 103 getting more complex, an application driver script 102 may be used to control the distributed application 103. The application driver script 102 may be written in any scripting language. In one embodiment, the script may be in Perl scripting language. The application driver script 102 may be used to prepare the distributing application execution environment. In some cases, the application driver script 102 may be acting as a driver shell that insulates an end user from the tedium of choosing the appropriate environment in which the distributed application is run.

Figure 2:
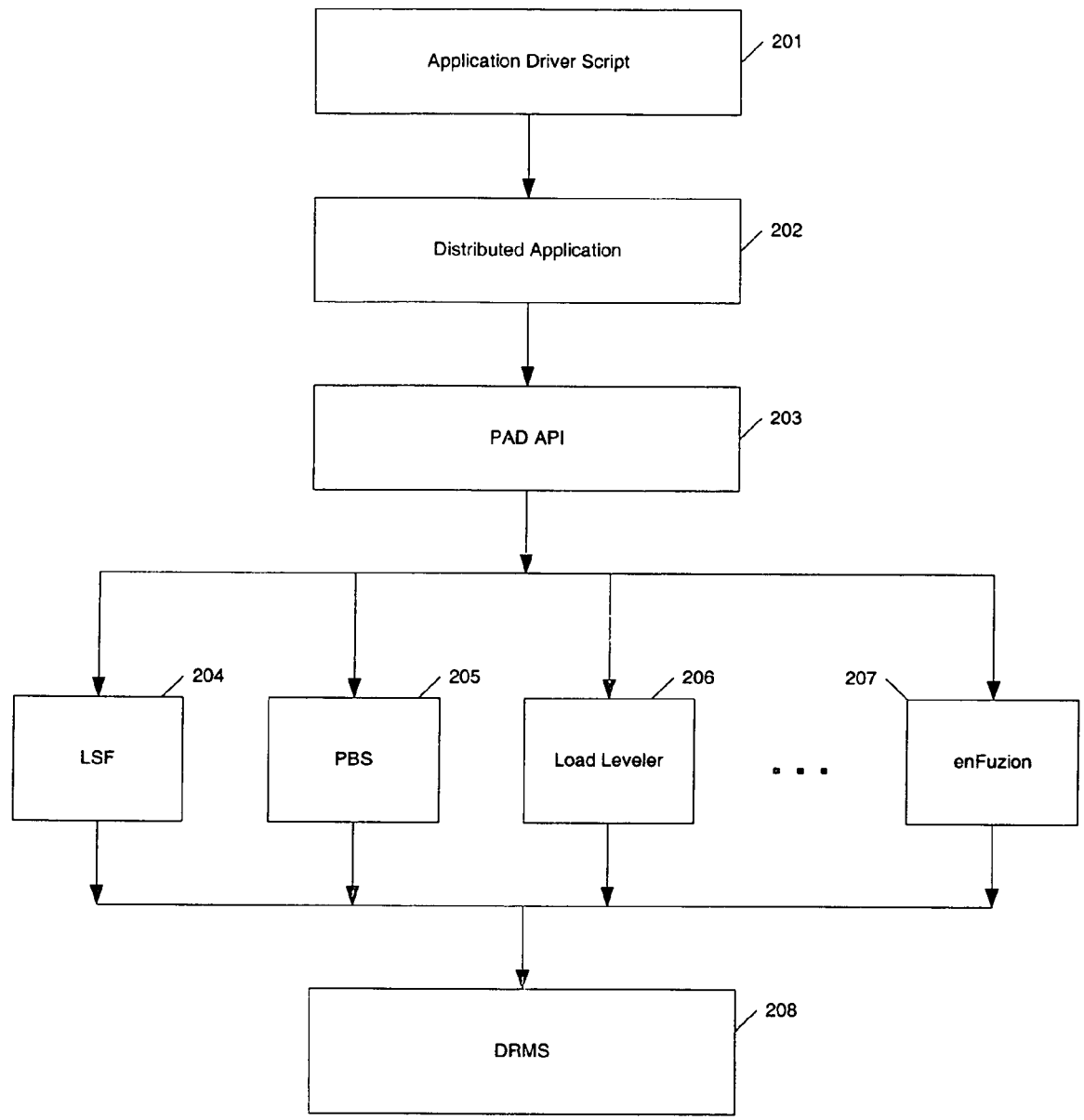
FIG. 2 illustrates an embodiment of an exemplary PAD application programming interface (API).

FIG. 2 illustrates architecture of the PAD according to one embodiment. The architecture includes an application driver script 201. The application driver script 201 provides an interface to an end user to execute the distributed application 202. The application driver script 201 may include operating environment and parameters of an intended DRMS. The distributed application 202 calls PAD library API 203 to submit a request to a targeted DRMS. The PAD API 203 provides a uniform API to access different DRMS. The PAD API 203 encapsulates specific information to interface to each of the different DRMS, one per distributed application, such as LSF 204 from Platform Computing, PBS 205 from Veridian, LoadLeveler 206 from IBM, or enFuzion 207 from TurboLinux. Other DRMS may be used.

The PAD library 203 translates the request from the distributed application 202 to another request compatible with the intended DRMS. For example, if a user desires to use DRMS LSF 204, the user may choose LSF at the distributed application execution time. The PAD library 203 then translates the request to a format compatible to a specific API of LSF 204, such that the request can be handled correctly by LSF DRMS subsequently. As a result, the end user or the developer does not need to know the specific API of LSF 204. All they need to do is to specify the intended DRMS and call PAD API, and the PAD library 203 will properly take care of how to submit request to LSF 204. Similarly, the end user may choose to access other DRMS systems, such as PBS 205, by simply selecting PBS before the distributed application execution.

Figure 3A:
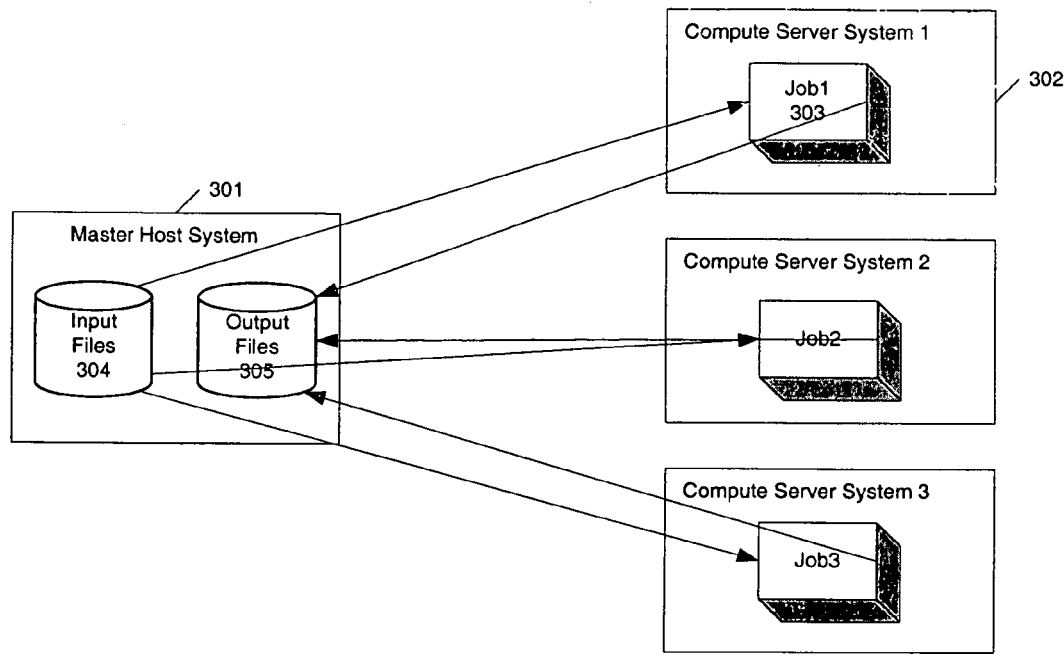
FIG. 3A illustrates a block diagram of an exemplary application data handling of an embodiment of PAD.
Figure 3B:
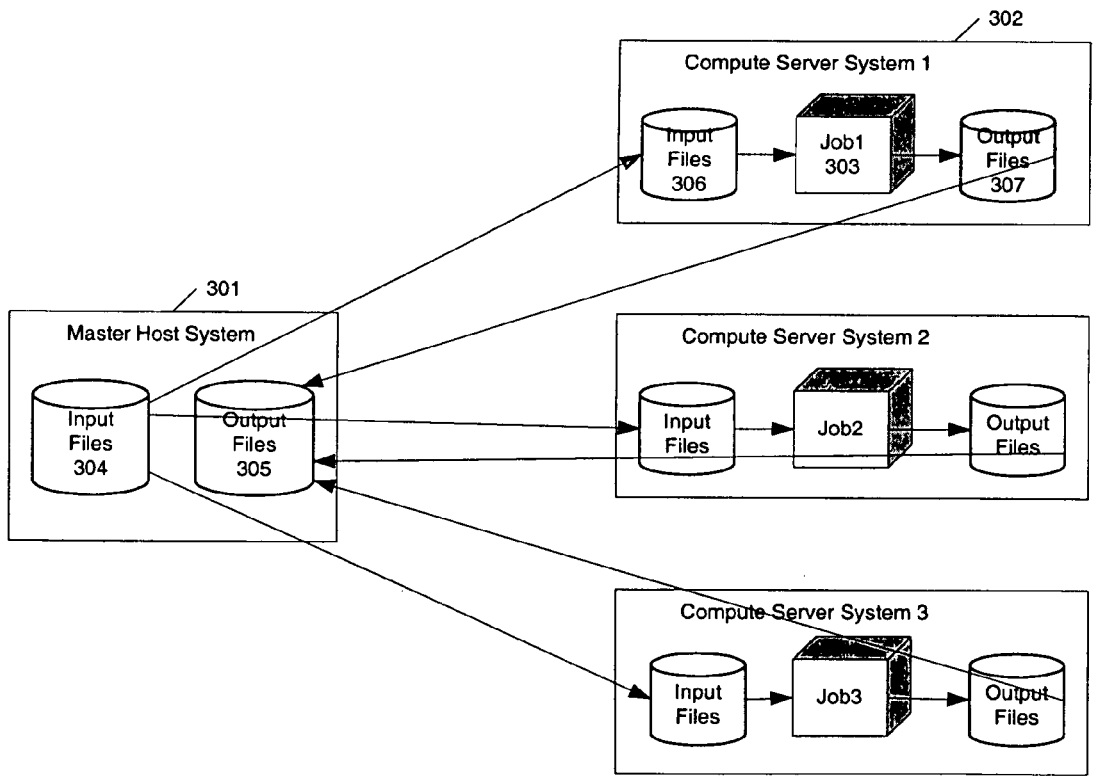
FIG. 3B illustrates a block diagram of an exemplary application data handling of an embodiment of PAD.

In addition to having very different interfaces, DRMSs have different approaches to handle remote computations. Typically, there are two modes in execution of distributed applications: data centric mode and job centric mode. FIG. 3A shows a typical data centric mode and FIG. 3B shows a typical job centric mode. Referring to FIG. 3A, under the data centric mode, the distributing application master host created files (e.g., input files 304 and output files 305), are stationary and are not moved to the remote compute server 302. Under the data centric mode, the computations are performed in a shared disk storage space. Under the job centric mode, as illustrated in FIG. 3B, private copies of files, such as input files 306 and output files 307, are used for a remote job 303 at the remote compute server 302. Under the job centric mode, the remote jobs are executed in the compute server's local directories, which requires proper file staging to and from the compute servers.

An embodiment of the PAD library implements a neutral model supporting both modes. The developers do not need to know how to handle the specifics of these modes, such as file staging under job centric mode. All they need to do is to specify the input and output files in both of these modes and the PAD library will handle them properly. While the developer may restrict the distributed application implementation to either one of these modes, it may be more appropriate for the end user to decide. The PAD API hides all of these complexities from the developers and end users.

Figure 4:
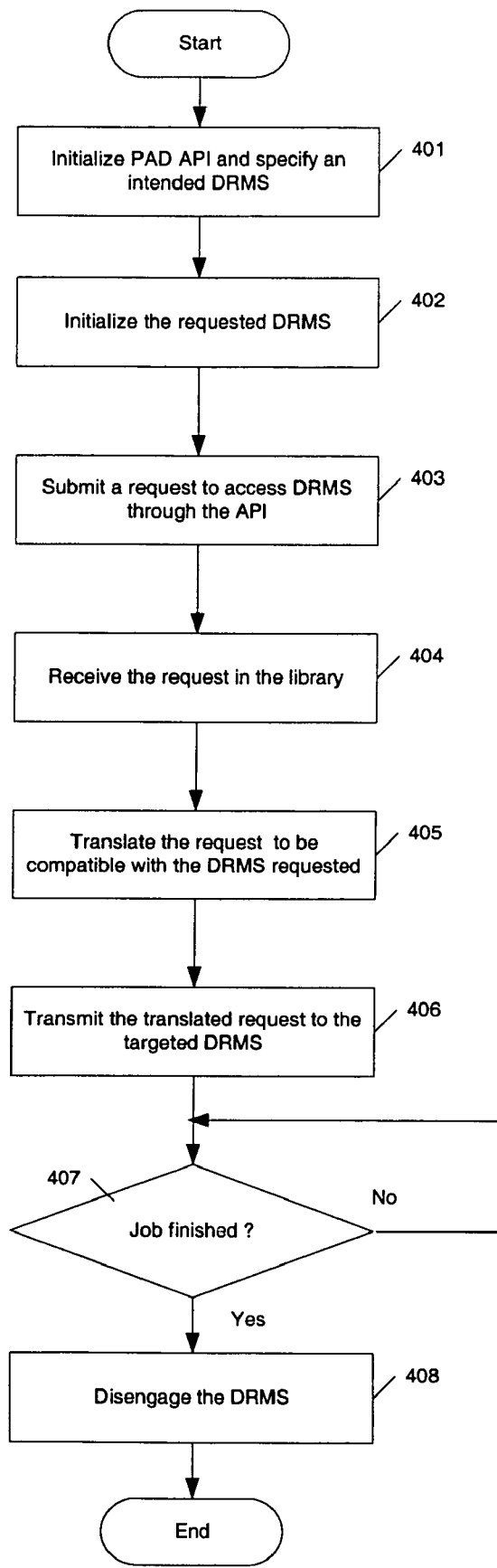
FIG. 4 illustrates a flowchart of an exemplary process according to one embodiment of the PAD API.

FIG. 4 illustrates a flowchart of a method of PAD API according to one embodiment. In that embodiment, the method includes receiving an original request for using a distributed resource management system (DRMS) through an application distributor application programming interface (API), the application distributor API being independent of the DRMS, selecting the DRMS as requested, translating the original request to a second request compatible with the selected DRMS, and transmitting the translated second request to the selected DRMS.

Referring to FIG. 4, when a distributed application is executed, at block 401, the distributed application initializes the PAD library by specifying all necessary information for a DRMS system. The initialization may be conducted through a scripting file, a set of global environmental variables or by direct calls to the PAD API. DRMS is selected via an environmental variable by either of the former two ways above. At block 402, a requested DRMS is initialized. After the initialization, at block 403, the distributed application calls the PAD API and submits a request to DRMS through the PAD library API 404. Based on the initialization, the PAD library selects the targeted DRMS. At block 405, the PAD library translates the request to be compatible with the targeted DRMS, such that the request can be recognized and executed by the appropriate DRMS. At block 406, the translated request is then transmitted to the targeted DRMS. In one embodiment, the request is transformed to a script, such as remote script 109 of FIG. 1. Such script is created on the fly by the PAD library. While the jobs are being executed at a compute server, at block 407, the PAD could wait for the remote job executions to finish. Once the jobs have finished executing, at block 408, the distributed application disengages PAD library PAD library disengages from the DRMS, and distributed application exits.

The routines may be grouped in four categories: init and exit, job submission, job monitoring and control, and auxiliary routines. The job submission routines allow a developer to specify a remote execution command, mode of job execution, mode of disk utilization, files to be staged, manipulation of standard input, output, and error streams, native DRMS options to be passed, and job name to be used for the job submission. The job monitoring and control routines contain job stopping, resuming, and killing, waiting for the remote job until the end of its execution, checking the exit code of the finished remote job, checking the remote job status, and waiting for all the jobs to finish execution. The auxiliary routines serve for tracing and error monitoring. The tracing is useful when there are multiple processes spawned.

Figure 5:
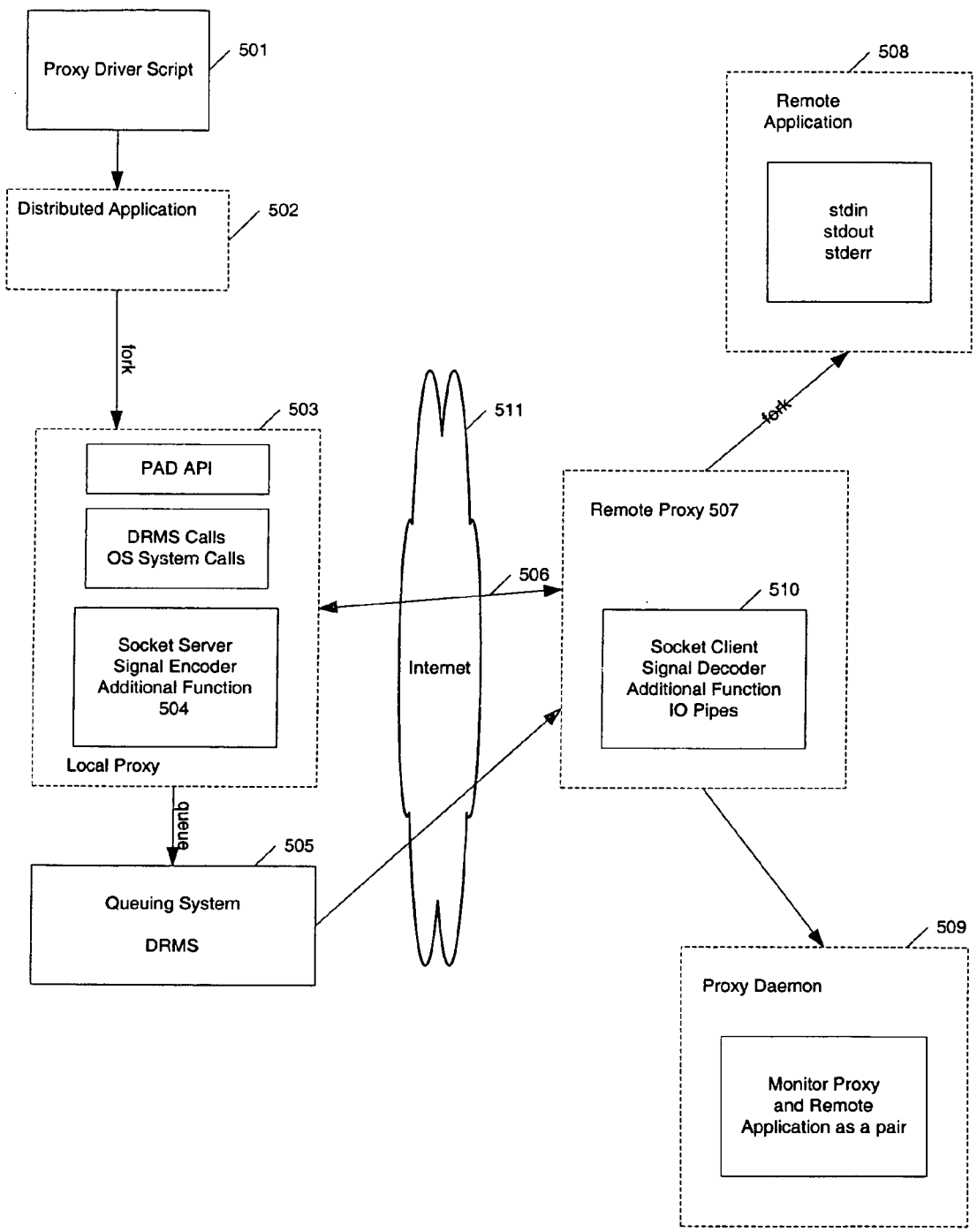
FIG. 5 illustrates a diagram of an embodiment of a PAD with proxies.

FIG. 5 illustrates an embodiment of distributed system with proxies. There are systems where an application spawns its helper or child applications to do some work for it, and communicates with each child through a communication channel, such as a pipe. Upon relocation of the child process to a remote host, the notion of a pipe as a carrier of data streams between the parent application and the child process is broken. According to an embodiment illustrated in FIG. 5, a set of proxies is provided, one on the local host and one on the remote host. As a result, after the child process has been relocated to a remote site to be executed, the data are transported across a network to connect the parent distributed application and the child process as if they were executing on the same host. In addition to this basic functionality the proxies have a customizable part for providing additional functionality.

Referring to FIG. 5, when a distributed application 502 is started the distributed application spawns a local proxy instead of its helper or child application. The local proxy, with execution environment set up in Proxy Driver Script 501, submits or queues a remote proxy job with DRMS 505, using a PAD API, such as PAD library API 104 of FIG. 1. The PAD library identifies the proper DRMS and translates the remote proxy job request to comply with the API of the specific DRMS requested. Before the local proxy submits a remote proxy job it starts a communication server 504 at the local host. In one embodiment, the communication server may be a socket server. The local proxy 503 provides the basic functionality and a customizable part where developers may add customized functionality to extend its basic features. The command line parameters that were intended for the helper or child application are part of the remote proxy command line parameters.

The local proxy may perform other tasks such as encoding signals and transmitting data. The signals are transmitted from the distributed application and are intended for the helper or child application. The data could be transmitted in both directions, helper or child application sends data to the distributed application. Likewise, the distributed application could be sending data to the helper or child application.

At the remote site, once the remote proxy starts running, the remote proxy spawns a remote or helper application 508 with the same command line parameters that were set by the distributed application. The remote proxy 507 then starts a communication client at the remote site. In one embodiment, the communication client may be a socket client. The remote proxy 507 uses the communication client to connect with the communication server 504 running at the local proxy, to form a communication channel 506 between the local proxy 503 and the remote proxy 507. The communication channel 506 effectively connects the remote helper or child application (formerly child process on the local machine) with its distributed application 502. It is useful to note that the local and the remote proxies are implemented to functionally replicate the original communication channel between the distributed application and the helper or child application, when they are communicating to the distributed and helper or child application respectively. The helper or child application is replaced with a system of local proxy, remote proxy, and now remote helper or child application. From the distributed application view (e.g., the parent distributed application), there is no difference when it communicates with its child application. The parent distributed application communicates the same way to the local proxy, as to its original child application.

The communication server, for example a socket server, of the local proxy listens for the remote proxy socket connection and handles the incoming socket data including the transfer of the remote proxy child application process ID. The outgoing socket data connection is used to encode the signal and to transfer data from the distributed application 502. Typically, the remote application 508 uses standard input and output (e.g., stdin, stdout, or stderr) to transfer data back and forth with its parent distributed application. The data are intercepted and retransmitted by the local and remote proxies.

The local proxy could be a standalone process or it could be embedded in the distributed application. The remote proxy is a standalone process. Application developers or end users may individually customize the local and remote proxies, such that the communication between the child process and its parent distributed application contains more functionality and flexibility. Similar to the PAD library API of FIG. 1, the distributed application may be invoked by a proxy driver script 501. The proxy driver script 501 may be written in any scripting language, such as Perl, or it could be a graphic user interface (GUI) to control or interact with the distributed application 502. The end user may use the proxy driver script to set up the environment for the local proxy execution.

The local and remote proxies may be customized by the developer. The developer may add extra parameters to the original helper or child application command line parameter list. The extra parameters are obtained from the end user configured customized files. The developer has to properly stage input and output files from the original command line parameters to and from the remote host. The remote proxy uses its communication client program to propagate the data and decoded signals from the local proxy to the remote child application on its remote node. The remote proxy has to decode the signals received from the local proxy to resend them to the remote helper application. It also transfers data from the remote helper application back to the master host. The local proxy and remote proxy may be implemented in multithreaded or in multiplexed form.

In addition, according to one embodiment, a proxy daemon 509 may be employed to monitor the remote proxy 507 and the remote application 508. The purpose of the proxy daemon 509 is to ensure that the remote application is terminated if it is still running after the termination of the remote proxy. For example, when the remote proxy is terminated by the local proxy 503 or by the DRMS 505, leaving the remote application 508 running by accident, the proxy daemon 509 terminates the remote application 508 since it is no longer needed. One proxy daemon monitors all the remote proxy/remote application pairs on one machine.

When there are no remote proxy/remote application pairs for a predetermined amount of time the proxy daemon 509 terminates itself since it is no longer needed. The proxy daemon is transparent to the end user and developer.

Figure 6:
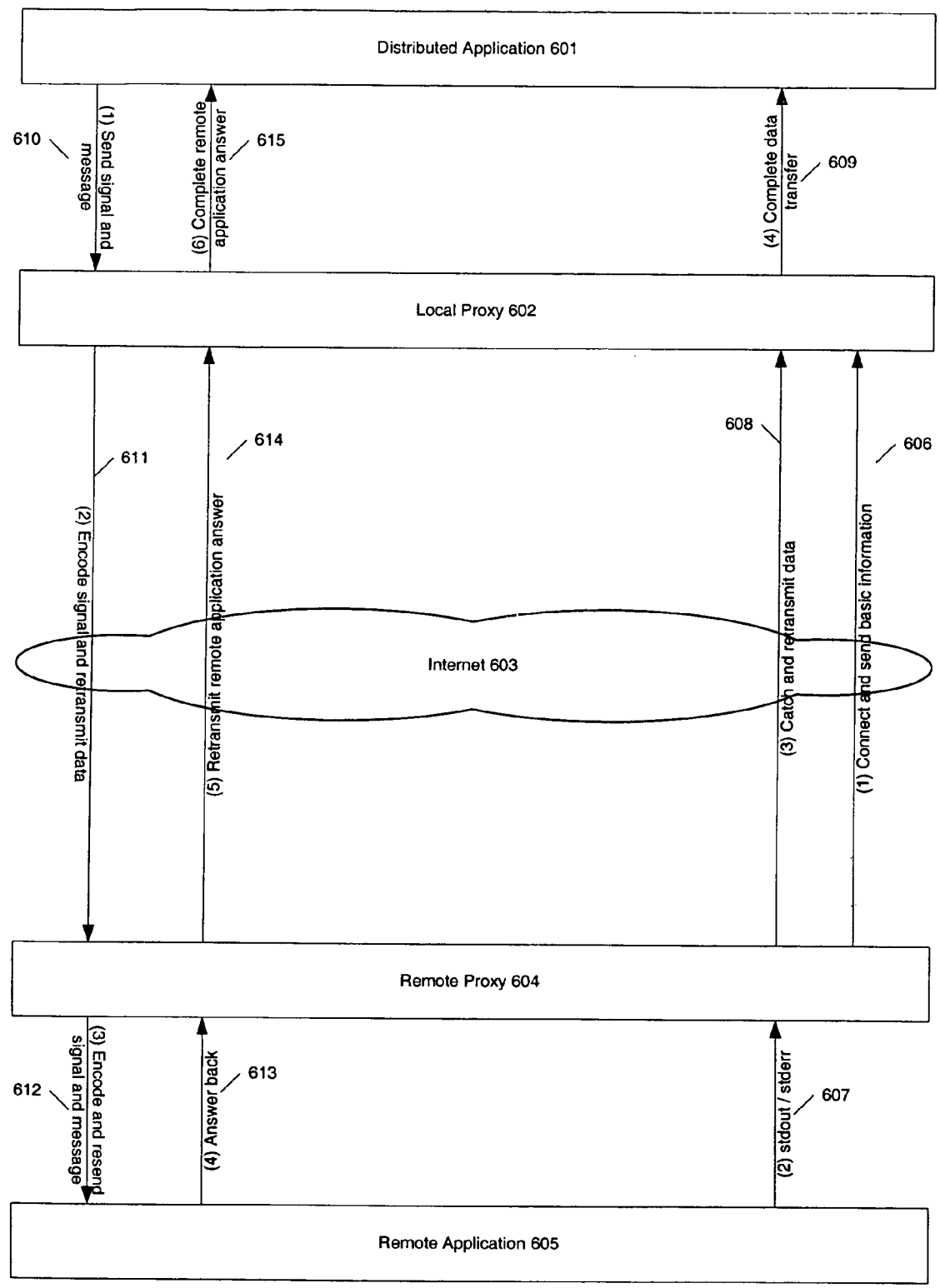
FIG. 6 illustrates an exemplary communication between a local node and a remote node according to one embodiment of a PAD with proxies.

FIG. 6 illustrates operation flow between a local proxy and a remote proxy according to one embodiment. Before the parent distributed application 601 can communicate with its remote child application 605, a communication channel needs to be established between the local proxy 602 and the remote proxy 604 over the network 603. When the remote proxy 604 is launched by either the local proxy 602 or the DRMS at the local node, the remote proxy 604 starts a communication client, for example a socket client to connect to the communication server, for example a socket server which is started within the local proxy when the local proxy 602 is launched. During the handshaking, basic information is exchanged between the local and remote proxies. Thereafter, the remote child application 605 sends data through standard output channels 607 (e.g., stdout and stderr). The data stream is captured by the remote proxy 604 and redirected 608 to the local proxy 602 through the communication channel over the network 603. The local proxy 602 in turn completes 609 the data transfer to the parent distributed application 601.

Once the communication channel has been established between the local and remote proxies, the parent distributed application can exchange data with its remote child application. The parent distributed application exchanges data with its remote child application in the same way as usual, even though the remote child application has been relocated to a remote site. In a conventional method, once the remote child application has been relocated to a remote site, the communication channel between the parent and the child (e.g., pipe) is broken. With the use of the local and remote proxies, the communication channel is maintained by the proxies.

When the parent distributed application 601 desires to communicate with its remote child application 605, it could send a signal and/or a message 610 to the local proxy 602. The local proxy 602 encodes the signal and sends the encoded signal and/or message 611 to the remote proxy 604 through the communication channel (e.g., socket channel), over the network 603. The remote proxy 604 then decodes the signal and transmits the decoded signal and/or a message 612 properly to the remote child application 605. The remote child application may reply by transmitting the reply 613 back to the remote proxy 604 which in turn redirects the data 614 through the communication channel over the network, to the local proxy 602. The local proxy 602 then completes the transfer 615 back to the parent distributed application 601.

With the help of the local and remote proxies, the distributed application, we could call it a parent application, 601 does not need to know where the remote child application 605 is being executed. The remote proxy 604 has spawned the remote child application 605, while the distributed application 601 has spawned the local proxy. As long as the communication channel is maintain between the local and remote proxies, the data exchanged between the distributed application and the remote child processes is properly handled. All the local proxy and remote proxy need to do is to correctly communicate with the distributed and remote child applications respectively.

Figure 7:
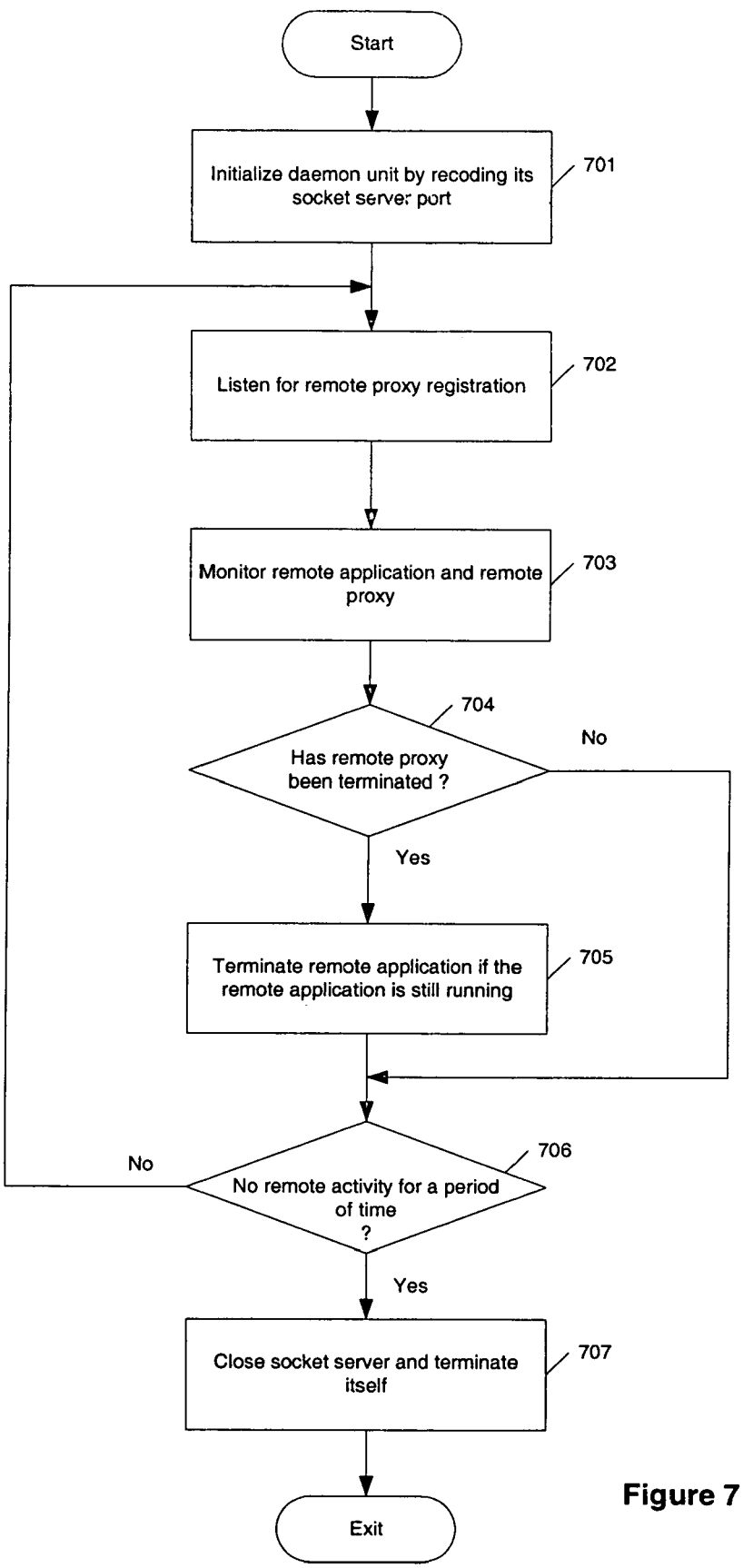
FIG. 7 illustrates a flowchart of an exemplary process of a daemon according to an embodiment of the PAD with proxies.

FIG. 7 illustrates a flowchart operation of a proxy daemon. The purpose of the proxy daemon 509 is to monitor the activities of both remote proxy 507 and the remote child application 508. The proxy daemon is launched by the remote proxy. One proxy daemon handles all of the remote proxy/remote child application pairs on one compute node.

Referring to FIG. 7, at block 701, when the proxy daemon is launched, it records its own communication server port. At block 702, the proxy daemon listens and waits for the registration from the remote proxy. Once the remote proxy registers itself and the remote application to the proxy daemon, the proxy daemon monitors the activities of both remote proxy and the remote application, at block 703. At block 704, the proxy daemon may detect whether the remote proxy has been terminated. If the remote proxy has been terminated, at block 705, the proxy daemon terminates the remote application if the remote application is still running. At block 706, the monitoring process continues until there are no remote proxy/application activities for a pre-specified amount of time. In which case, the proxy daemon closes the communication server, at block 707, and terminates itself since it is no longer needed.

After the proxy daemon is launched and initialized, the proxy daemon monitors any abnormal activities of the remote proxy and remote application. For example, at block 707, if the proxy daemon detects that the remote proxy has been terminated by either the DRMS or the local proxy at the local node, while the remote application is still running, the proxy daemon terminates the remote application at block 708. Thereafter, if no more remote proxy/application activities for a period of time are detected at block 709, the proxy daemon closes the communication server and terminates itself, at block 710.

Figure 8:
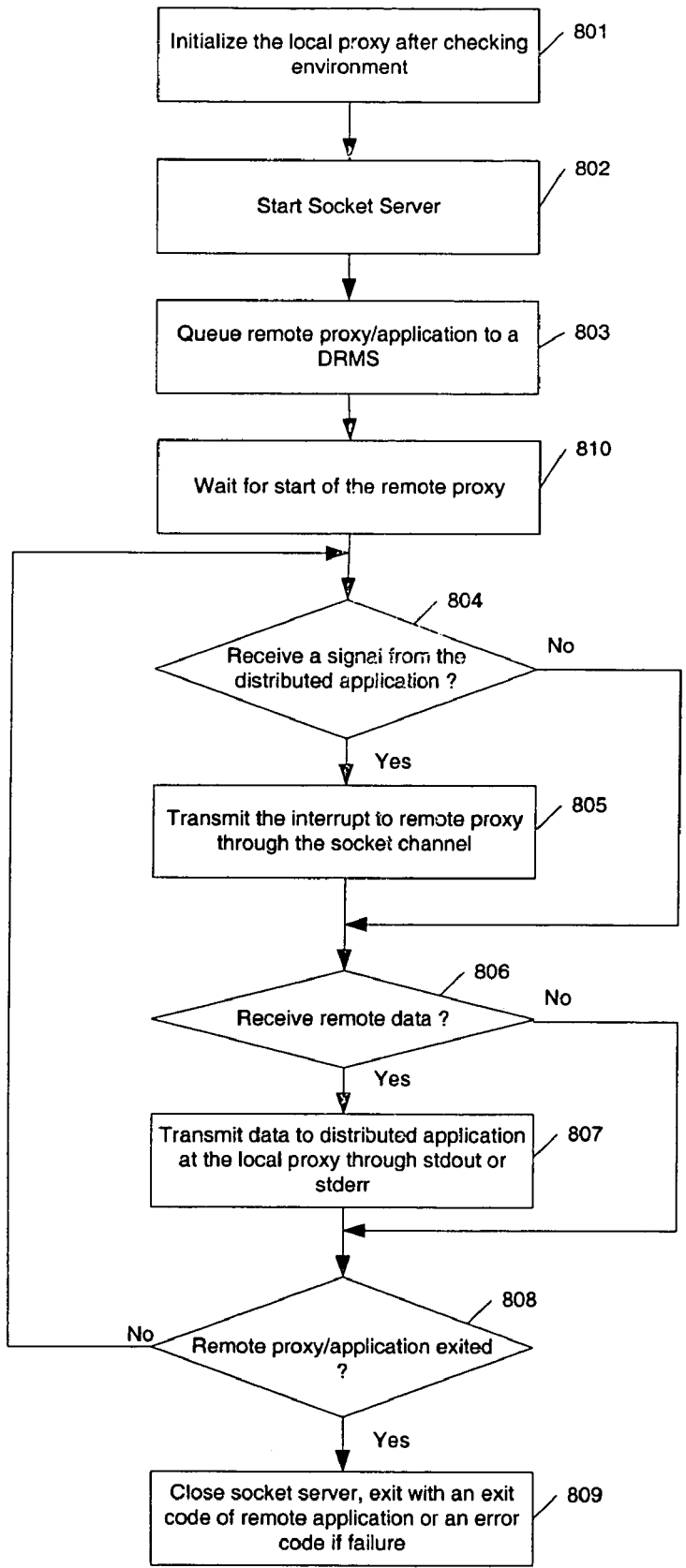
FIG. 8 illustrates a flowchart of an exemplary process of a local proxy according to one embodiment of the PAD with proxies.
Figure 9:
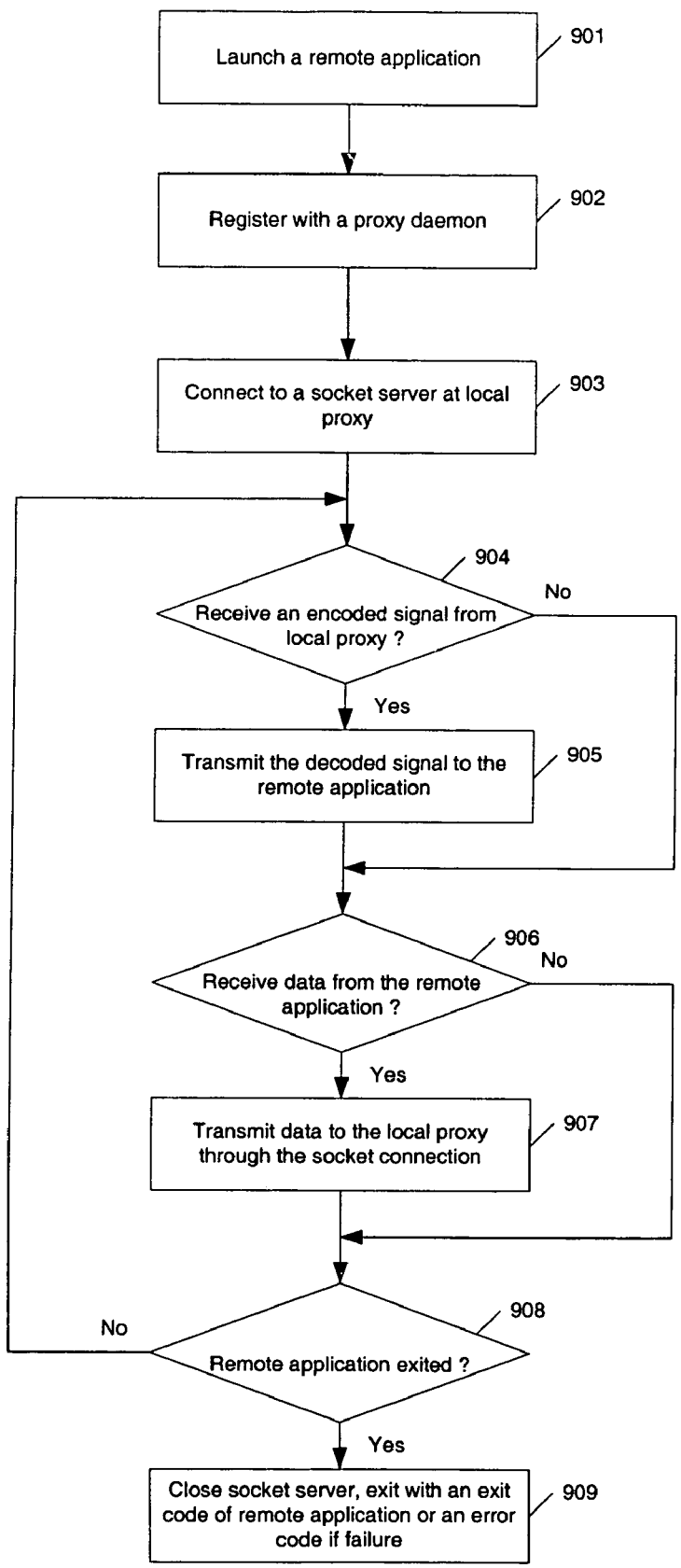
FIG. 9 illustrates a flowchart of an exemplary process of a remote proxy according to one embodiment of the PAD with proxies.

FIGS. 8 and 9 illustrate flowcharts of operation methods of a local proxy and a remote proxy according to one embodiment. In this embodiment, the method is replacing a child application with a local proxy application at a local node, the child application being launched from a parent distributed application, and the child application communicating with the parent distributed application, transmitting the remote proxy execution request to a DRMS by the local proxy. The remote proxy executes the child application as a remote child application at the remote node and maintains a communication channel with the local proxy. The remote child application communicates transparently with the parent distributed application through the communication channel established by the local and remote proxies.

Referring to FIG. 8, when a distributed application is started, at block 801, the local proxy is spawned by the distributed application. It is configured upon start by the execution environment set up by a user via proxy driver script 501. At block 802, the local proxy then starts a socket server so that a remote proxy can establish a communication channel from the remote node. At block 803, the local proxy queues the remote proxy job to the DRMS which in turn schedules the remote proxy job to a remote node for execution. If the local proxy receives a signal from the distributed application (e.g., user requests to interact with the distributed application), the local proxy transmits the encoded signal to the remote proxy through the socket channel set up previously, at block 805.

The local proxy also listens to the remote proxy for any remote activity. At block 806, if the local proxy receives remote data from the remote proxy through the socket channel, the local proxy redirects the data to the distributed application at block 807. At block 808, if the local proxy detects that the remote proxy/remote application has been terminated, the local proxy closes the socket server at block 809 and exits execution with the exit code of the remote helper application or an error code of any failure that prevented execution of the remote helper application.

Referring to FIG. 9, at block 901, when the remote proxy spawns the remote helper application the remote proxy launches the proxy daemon if one has not been already running. Once the proxy daemon is running, the remote proxy registers with the proxy daemon. After establishing a connection with the local proxy, block 803, the remote proxy also listens for any data coming from the local proxy or the remote application. At the block 904, if the remote proxy receives an encoded signal from the local proxy, it decodes the signal and retransmits it to the remote application at block 905. On the other hand, at block 906, if the remote proxy receives data from the remote application, it redirects the data to the local proxy through the socket connection at block 907. These data activities continue until the remote application exits at block 908, upon which time, the remote proxy closes the socket connection at block 909 and exits with the exit code of the remote helper application or an error code of any failure that prevented execution of the remote helper application.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method, comprising:
   replacing a child application with a local proxy application at a local node, the child application being launched from a parent distributed application, the child application communicating with the parent distributed application via the local proxy, the child application intended to be executed within the local node;
   transmitting from the local proxy, a remote proxy execution request to a distributed resource management system (DRMS) to distribute the child application to be executed by the DRMS at the remote node, the DRMS being located at a remote node communicatively coupled to the local node over a network;
   the DRMS executing at least a portion of tasks of the child application as a remote child application via a remote proxy at the remote node, the remote proxy interfacing the local proxy and the DRMS at the remote node; and
   maintaining a communication channel between the remote child application and the parent distributed application via the local proxy and the remote proxy directly coupled with each other, the remote child application communicating transparently with the parent distributed application through the communication channel established by the local and remote proxies, as if the child application is spawned from the parent distributed application and executed within the local node, and the maintaining the communication channel including
      receiving a message by the local proxy at the local node from the parent distributed application destined to the child application,
      the local proxy redirecting the message to a remote proxy at the remote node through the communication channel over the network without knowledge of the parent distributed application, and
      the remote proxy transmitting the message to the remote child application without knowledge of the parent distributed application.

2. The method of claim 1, wherein maintaining a communication channel comprises:
   starting a communication server within the local proxy at the local node; and
   starting a communication client within the remote proxy at the remote node, the communication client of the remote node communicating with the communication server of the local node over the network, and the communication server and client maintaining the communication between the remote child application and the parent distributed application without an acknowledge of the parent distributed application.

3. The method of claim 2, wherein the communication server is a socket server and the communication client is a socket client.

4. The method of claim 1 further comprising periodically monitoring the remote proxy and the remote child application at the remote node by a daemon monitor, the daemon monitor being located within the remote node.

5. The method of claim 4 further comprising the daemon monitor terminating the remote child application in response to a termination of the remote proxy if the remote child application is still running.

6. The method of claim 5 further comprising the remote node terminating the daemon monitor if there is no activity of remote proxy and remote child application for a predetermined period of time.

7. The method of claim 1, further comprising:
   selecting the DRMS as requested;
   receiving an original request to submit a remote job to execute the child application to a distributed resource management system (DRMS) using an application distributor application programming interface (API), the application distributor API encapsulating specific information with respect to the DRMS;
   translating the original request to be compatible with the selected DRMS, forming a remote job request to execute the child application for the selected DRMS; and
   transmitting the remote job request to the DRMS, the application distributor API providing a unified API to the parent distributed application to distribute the child application to a plurality of DRMS systems, wherein at least two of the DRMS systems include different APIs that are not compatible to each other, and wherein the application distributor API converts one or more calls from the parent distributed application to an API of a selected DRMS executing the child application if the one or more calls are not in a form compatible with the API of the selected DRMS, such that a developer of the parent distributed application does not have to modify the one or more calls to satisfy different APIs of different DRMS systems being accessed.

8. A system, comprising:
   a child application launched from a parent distributed application, the child application communicating with the parent distributed application;
   a local proxy being launched from the parent distributed application at a local node, the child application intended to be executed within the local node, the local proxy communicating with the parent distributed application, and submitting a request to a DRMS to execute remote proxy on a remote node on behalf of the child application to distribute the child application to be executed by the DRMS at the remote node;
   a remote proxy located at the remote node to execute at least a portion of tasks of the child application as a remote child application at the remote node, remote proxy interfacing the local proxy and the DRMS at the remote node; and a communication channel transparently established between the remote child application at the remote node and the parent distributed application at the local node, the communication channel being maintained by the local and remote proxies directly coupled with each other over a network, including receiving a message by the local proxy at the local node from the parent distributed application destined to the child application, the local proxy redirecting the message to a remote proxy at the remote node through the communication channel over the network without knowledge of the parent distributed application, and the remote proxy transmitting the message to the remote child application without knowledge of the parent distributed application.

9. The system of claim 8, wherein the communication channel comprises:

a communication server started within the local proxy at the local node; and a communication client started within the remote proxy at the remote node, the communication client communicating with the communication server over the network, and the communication server and client maintain the communication between the remote child application and the parent distributed application on the local node.

10. The system of claim 8 further comprises a proxy daemon being executed to periodically monitor the remote proxy and the remote child application being executed.

11. The system of claim 8 further comprising a library that implements an application programming interface (API) to receive the execution request from a user, the API being independent to the DRMS and encapsulating specific information of the DRMS.

12. The system of claim 11, wherein the API library has multiple paths for translating the execution request to be compatible with the DRMS requested.

13. A machine readable medium having stored thereon executable code which causes a machine to perform a method, the method comprising:

replacing a child application with a local proxy application at a local node, the child application being launched from a parent distributed application, the child application communicating with the parent distributed application via the local proxy, the child application intended to be executed within the local node;

transmitting from the local proxy, a remote proxy execution request to a distributed resource management system (DRMS) to distribute the child application to be executed by the DRMS at the remote node, the DRMS being located at a remote node communicatively coupled to the local node over a network;

the DRMS executing at least a portion of tasks of the child application as a remote child application via a remote proxy at the remote node, the remote proxy interfacing the local proxy and the DRMS at the remote node; and maintaining a communication channel between the remote child application and the parent distributed application via the local proxy and the remote proxy directly coupled with each other, the remote child application communicating transparently with the parent distributed application through the communication channel established by the local and remote proxies, as if the child application is spawned from the parent distributed application and executed within the local node, and the maintaining the communication channel including receiving a message by the local proxy at the local node from the parent distributed application destined to the child application, the local proxy redirecting the message to a remote proxy at the remote node through the communication channel over the network without knowledge of the parent distributed application, and the remote proxy transmitting the message to the remote child application without knowledge of the parent distributed application.

14. The machine readable medium of claim 13, wherein the method further comprises:

receiving a signal by the local proxy at the local node sent from the parent distributed application, the signal being sent to the child application;

encoding and redirecting the signal to the remote proxy at the remote node through the communication channel over the network; and remote proxy decoding the signal and resending it to the remote child application.

15. The machine readable medium of claim 13, wherein the method further comprises periodically monitoring the remote proxy and the remote child application at the remote node.

16. The machine readable medium of claim 13, wherein the method further comprises:

selecting the DRMS as requested;

receiving an original request to submit a remote job to execute the child application to a distributed resource management system (DRMS) using an application distributor application programming interface (API), the application distributor API encapsulating specific information with respect to the DRMS;

translating the first request to be compatible with the selected DRMS, forming a remote job request to execute the child application for the selected DRMS; and transmitting the remote job request to the DRMS, the application distributor API providing a unified API to the parent distributed application to distribute the child application to a plurality of DRMS systems, wherein at least two of the DRMS systems include different APIs that are not compatible to each other, and wherein the application distributor API converts one or more calls from the parent distributed application to an API of a selected DRMS executing the child application if the one or more calls are not in a form compatible with the API of the selected DRMS, such that a developer of the parent distributed application does not have to modify the one or more calls to satisfy different APIs of different DRMS systems being accessed.

17. The machine readable medium of claim 13, wherein maintaining a communication channel comprises:

starting a communication server within the local proxy at the local node; and starting a communication client within the remote proxy at the remote node, the communication client communicating with the communication server over the network, and the communication server and client maintaining the communication between the remote child application and the parent distributed application.

* * * * *